Figure 14:
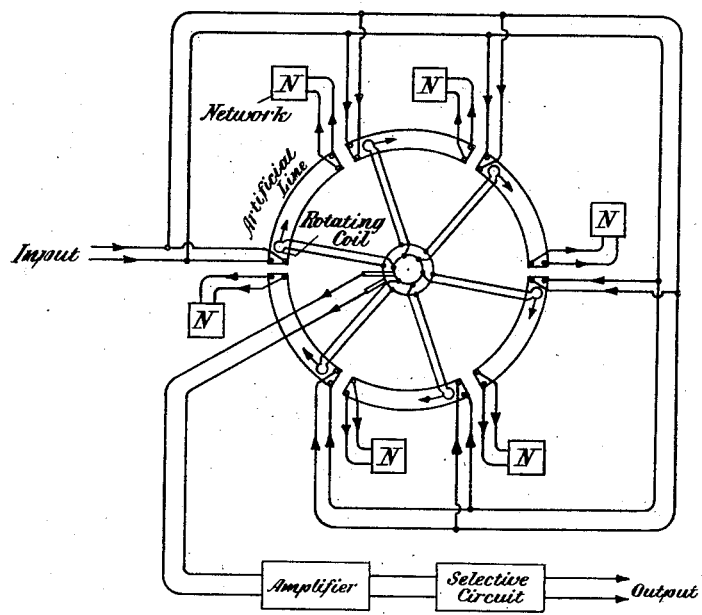

May 29, 1928.
N. R. FRENCH ET AL
1,671,151
METHOD OF AND APPARATUS FOR REDUCING WIDTH OF TRANSMISSION BANDS
Filed Dec. 10, 1924     5 Sheets-Sheet 1
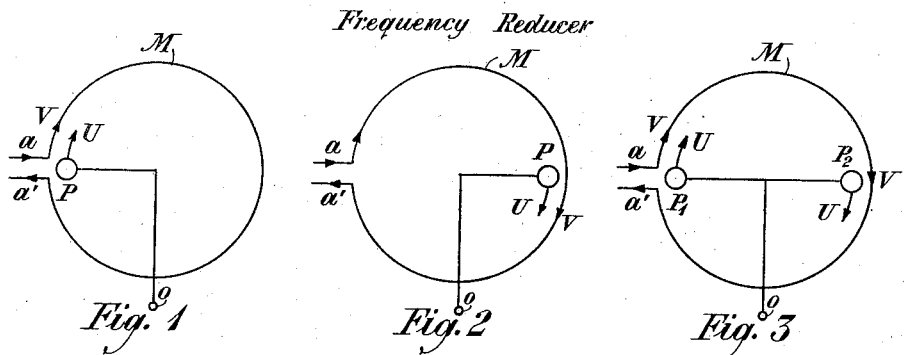
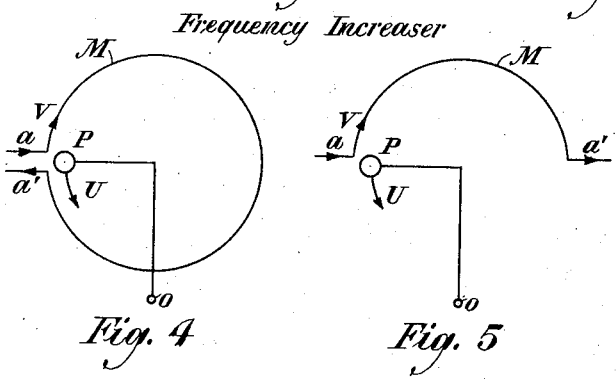
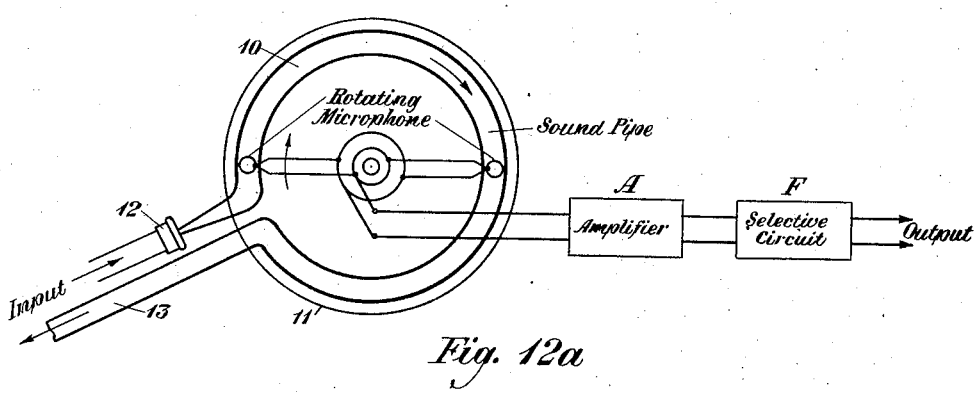
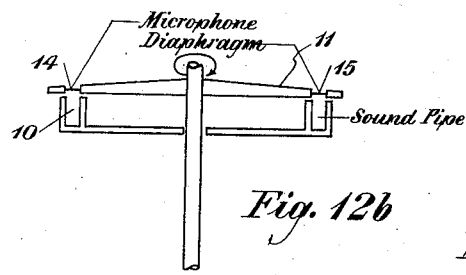
INVENTORS
N.R.French and M.K.Zinn
BY
ATTORNEY May 29, 1928.
N. R. FRENCH ET AL
1,671,151
METHOD OF AND APPARATUS FOR REDUCING WIDTH OF TRANSMISSION BANDS
Filed Dec. 10, 1924    5 Sheets-Sheet 2
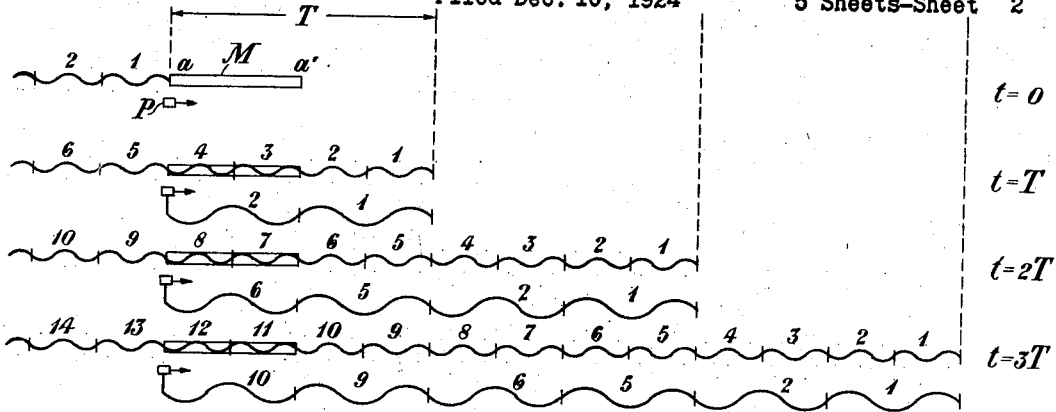
Fig. 6 (Frequency Reduction by Fig. 1)
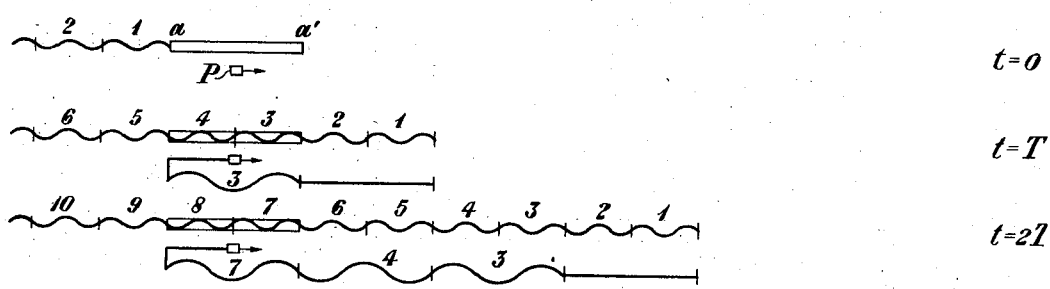
Fig. 7 (Frequency Reduction by Fig. 2)
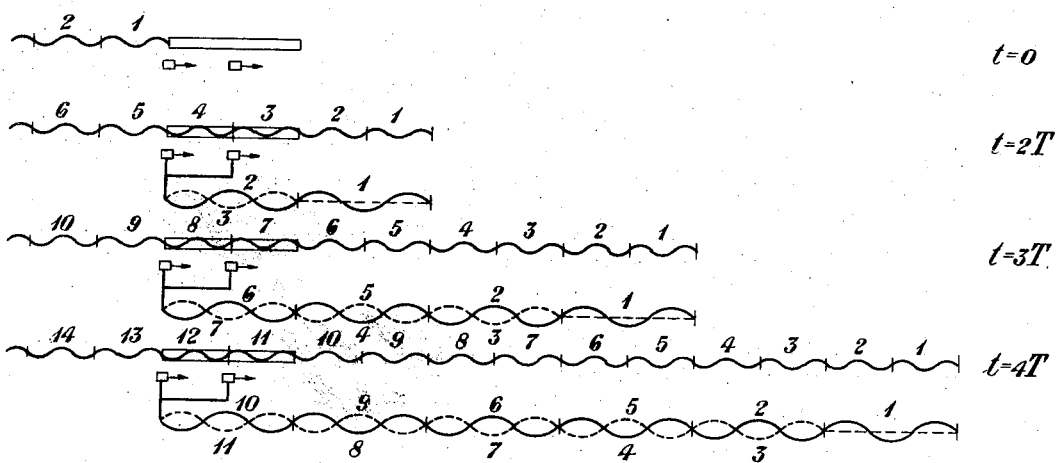
Fig. 8 (Frequency Reduction by Fig. 3)
INVENTORS
N.R.French and M.K.Zinn
BY
ATTORNEY May 29, 1928.
N. R. FRENCH ET AL
1,671,151
METHOD OF AND APPARATUS FOR REDUCING WIDTH OF TRANSMISSION BANDS
Filed Dec. 10, 1924
5 Sheets-Sheet 3
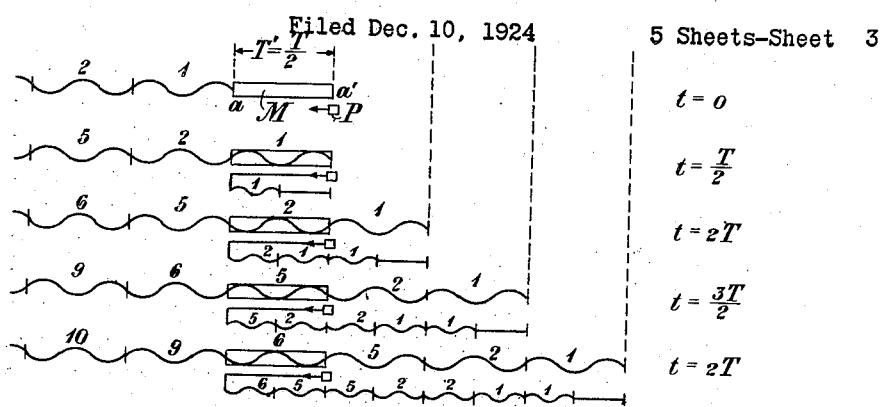
Fig. 9 (Frequency Increasement by Fig. 4 acting on wave converted by Fig. 1)
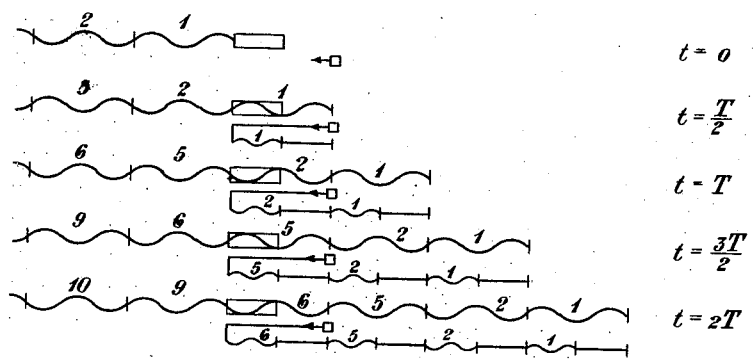
Fig. 10 (Frequency Increasement by Fig. 5 acting on wave converted by Fig. 1)
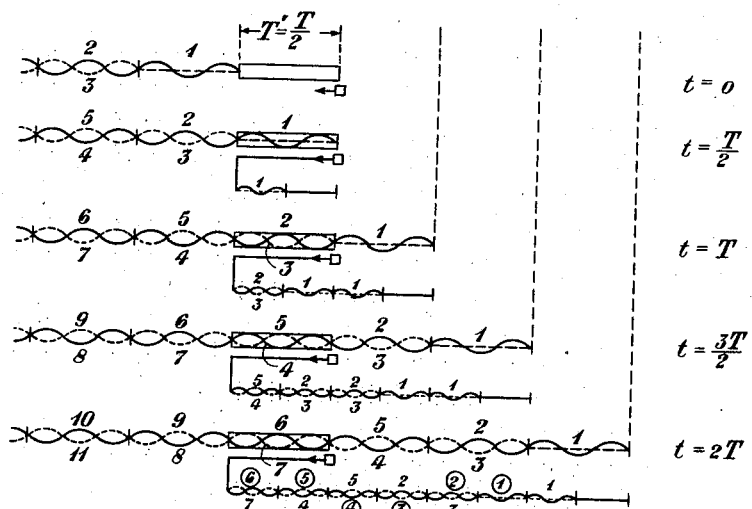
Fig. 11 (Frequency Increasement by Fig. 4 acting on wave converted by Fig. 3)
INVENTORS
N.R.French and M.K.Zinn
BY
ATTORNEY May 29, 1928.
N. R. FRENCH ET AL
1,671,151
METHOD OF AND APPARATUS FOR REDUCING WIDTH OF TRANSMISSION BANDS
Filed Dec. 10, 1924   5 Sheets-Sheet 4
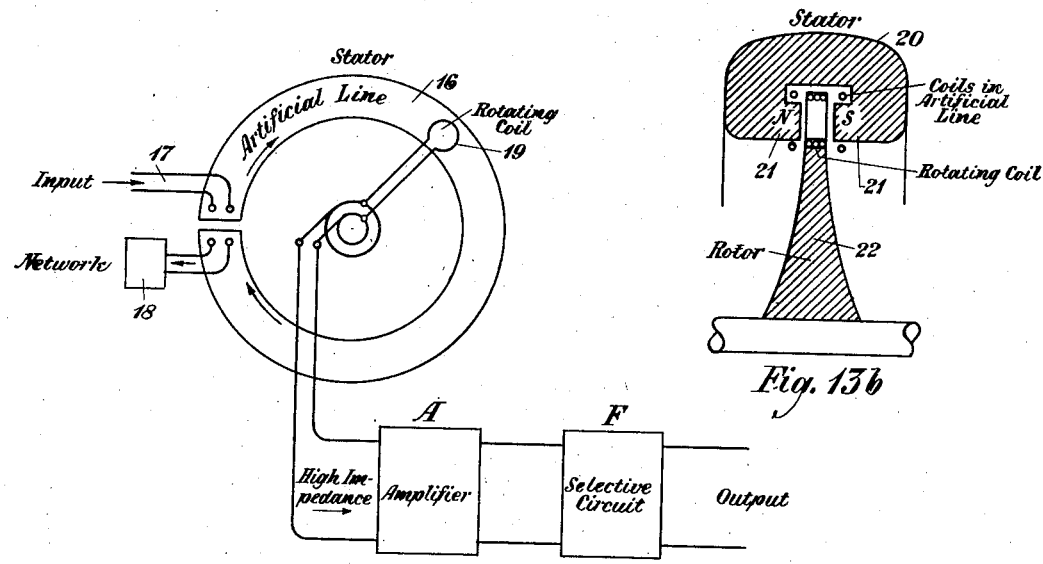
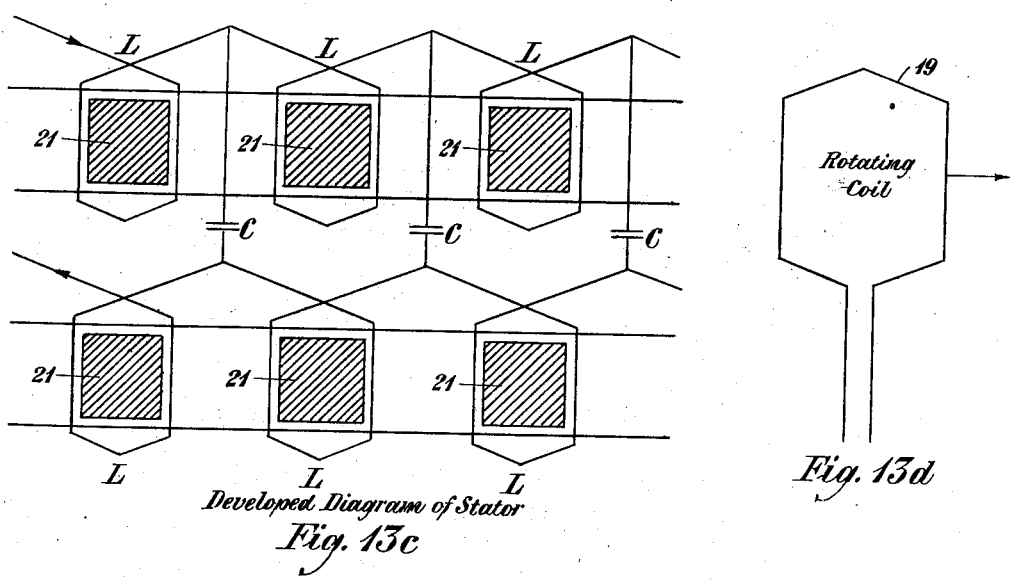
INVENTORS
N.R.French and M.K.Zinn
BY
ATTORNEY Patented May 29, 1928.

1,671,151

UNITED STATES PATENT OFFICE.

NORMAN R. FRENCH AND MANVEL K. ZINN, OF BROOKLYN, NEW YORK, ASSIGNORS TO AMERICAN TELEPHONE AND TELEGRAPH COMPANY, A CORPORATION OF NEW YORK.

METHOD OF AND APPARATUS FOR REDUCING WIDTH OF TRANSMISSION BANDS.

Application filed December 10, 1924. Serial No. 755,075.

This invention relates to the transmission of signals and more particularly to methods and apparatus for reducing the width of the frequency band required for the transmission of signaling currents, such, for example, as speech currents.

In accordance with the present invention it is proposed to convert each frequency of a signaling band to a lower frequency in such a manner that the converted frequencies will all bear the same ratio to the original frequency. For example, a band of 100 to 5,000 cycles might be converted into a band of 50 to 2,500 cycles. By the same principle the frequencies thus converted may also be reconverted to their original frequency values.

It should be noted that the frequency conversion of the present invention is quite distinct from the type of frequency translation involved in modulation and demodulation. Modulation and demodulation result in simply shifting all frequencies of a band up or down in the frequency spectrum without reducing the width of the band. Frequency conversion, in accordance with the principles of the present invention, however, reduces or increases all frequencies by a certain factor and therefore reduces or increases the width of the band by this same factor.

A system involving frequency conversion for squeezing together the frequencies of a band and thereby reducing the width of the band has certain advantages. In transmission over wires, for example, the attenuation increases with the frequency. If, therefore, the band to be transmitted is reduced in width before transmission, the signaling band will be subjected to less attenuation because it will be transmitted at a lower frequency level.

The use of a narrower frequency band would also be of importance from the standpoint of improving the ratio of the signal to static in wireless transmission. Static may be considered to consist of a large number of frequencies distributed more or less uniformly throughout the radio frequency range. Concentrating the signal energy into a narrower band in the manner proposed would enable greater selectivity to be used in the receiver with a consequent reduction in the amount of static interference received. On account of the comparatively limited range of frequencies available for either wire or wireless transmission the number of systems which can operate without mutual interference is limited. The proposed method of reducing the width of the frequency bands would therefore result in an increase in the number of channels which could be used.

In either wire or radio transmission secrecy is often desirable. Squeezing the signal band sufficiently will cause the received waves to be incomprehensible to anyone receiving them unless equipped with apparatus for again expanding the received band. The system will therefore result in greater secrecy.

Figure 15:
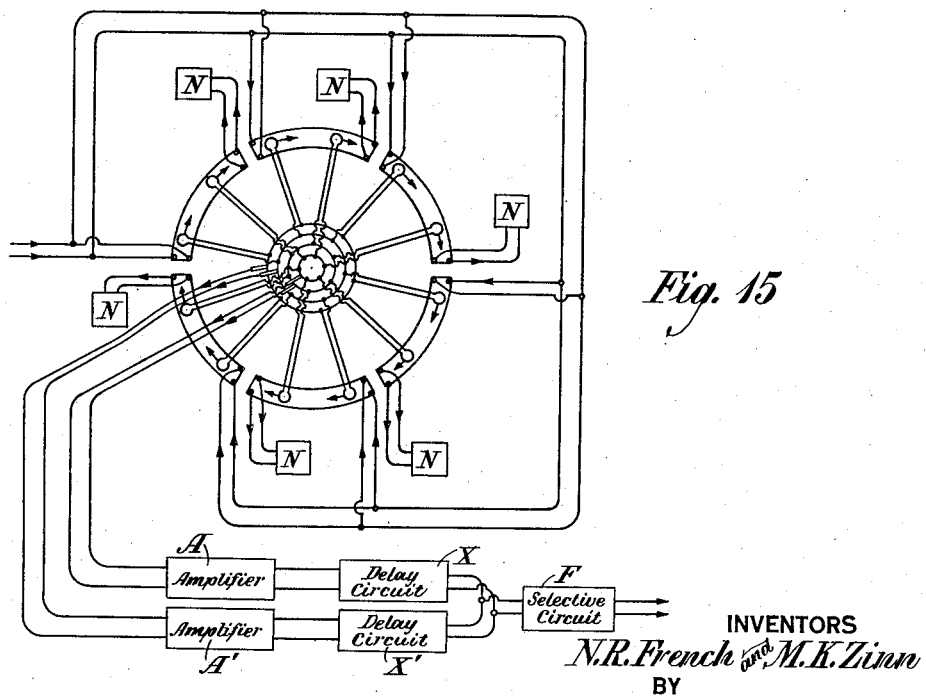

The invention may now be more fully understood from the following detailed description when read in connection with the accompanying drawing, Figures 1, 2 and 3 of which illustrate schematically how the width of the frequency band may be reduced. Figs. 4 and 5 similarly illustrate how the band may be again expanded in width. Figs. 6, 7 and 8 are curved illustrating the principles underlying different methods of reducing the width of the band. Figs. 9, 10 and 11 are curved illustrating different methods of increasing the band width. Figs. 12$^a$ and 12$^b$ show one form of apparatus for producing a frequency translation in accordance with the present invention. Figs. 13$^a$, 13$^b$, 13$^c$ and 13$^d$ illustrate details of a modified form of apparatus for producing a frequency conversion in accordance with the invention while Figs 14 and 15 are schematic circuit arrangements illustrating further applications of the invention.

Before proceeding with the detailed exposition of the invention, it is desirable to briefly outline the underlying principles therof.

Let us assume a train of waves moving through space at a velocity V and an observer moving near the line of wave propagation with a velocity U. It is evident that the number of waves received per second by the observer is different from the number of waves per second passing any fixed point in space. It can easily be shown that $$n = f \frac{V+U}{V} \quad (1)$$

where  $f$ = initial frequency of wave train,
$n$ = observed frequency of wave train,
$V$ = velocity of wave train,
$U$ = velocity of observer.

If the frequency is to be reduced the movement of the observer and the train of waves should be in the same direction, the sign before $U$ in the equation being negative. For increasing the frequency, the observer must move in a direction opposite to the waves, the sign in the above equation in this case being positive.

It is evident that the principles above outlined may be utilized for frequency conversion in a signaling system by providing an energy pick-up device capable of motion along a train of signaling waves which are to be converted. Such a system will involve either a change in the time of transmission or a mutilation of the wave form. For example, if a train of waves is to be converted in frequency without losing any of its original form, the time length of the converted train will be greater or less than the time length of the original train according as the waves are decreased or increased in frequency.

By way of illustration, let us assume a system in which vocal sounds are recorded upon a moving phonograph record by means of a stationary needle and in turn picked up and retransmitted to a distant point by a moving needle revolving in the same direction as the record. If the velocity of the moving needle were half that of the record, the frequency band involved by the voice signal would be reduced by half, but the time to transmit a given train of speech waves would be twice that required for the speaker to generate them. This would result in a confusing delay between two parties conversing. There would be no advantage in such a system from the standpoint of increasing the signaling capacity of the transmitting medium, because although the frequency band required for each channel will be only half as wide, it would take twice as long to transmit a message with no net gain in traffic volume. Such a system might, however, be useful in certain instances to reduce attenuation, increase secrecy, or reduce interference.

On the other hand, if the time length of the converted wave train is to be the same as that of the original train, there would be some distortion. Certain types of distortion may be permissible in order to eliminate the disadvantage inherent in the delay in transmission. Such distortion would, of course, reduce intelligibility, but, by proper arrangements, the distortion may be made of such a character that the narrowed band may be transmitted in the same time as the normal band and still be intelligibly received.

Where frequency conversion is accomplished at the expense of distortion, the distortion may be made either of two types. Where the frequency is reduced, either a fixed percentage of the impressed oscillations (equal to the difference between the conversion ratio and unity) may be skipped by the pick-up device connected to the output, or impressed oscillations occurring during adjacent time intervals may be superposed on each other in the output after conversion. Where the frequency is increased, there may be in the converted train of waves either repetitions of successive parts of the unconverted wave train or blank intervals in which there are no waves.

It follows, therefore, that where a signaling band, such as a speech band, is to be reduced in width for transmission and again expanded to its normal width at the receiving station, the character of the distortion in the reproduced band will depend upon the type of translation which takes place at the transmitting and receiving station. If, at the transmitting station, the frequency is reduced with the omission of alternate parts of the wave train, the successive parts transmitted may be again increased in frequency at the receiving station. This would ordinarily result in the production of blank intervals between the retranslated parts of the wave train. However, if these intervals occur at a sufficiently high frequency, the train of speech waves may nevertheless be quite intelligible. The intelligibility may be increased, however, by so converting the waves at the receiving station that each part, when increased in frequency, will be repeated. The repeated parts will then fill up the gaps or blank intervals which will otherwise exist. In other words, the repeated parts at the receiving station will take the place of the parts which were omitted in the translating operation at the transmitting station. The wave train finally impressed upon the receiver therefore will approximate the form of the wave train originally generated at the transmitting station.

If the frequency conversion at the transmitting station is accomplished in such a manner that successive parts of the wave train are superposed upon each other during transmission and the frequency conversion at the receiving station is accompanied by a repetition of successive parts translated, the final wave train will contain all of the elements or parts of the original wave train in their regular order but will have superposed thereon repeated parts, some of which will precede and some of which will follow the duplicate parts in the complete received wave train. This will produce an echo effect, but, if the frequency at which repetitions occur is made sufficiently high, the echo effect may not be any more disturbing than the echoes now encountered in commercial transmission lines due to reflection.

In order to understand how these results may be accomplished, reference will now be made to the schematic disclosures of frequency reducers and frequency increasers shown in Figs. 1 to 5, inclusive, and the various curves shown in Figs. 6 to 11, inclusive.

In Fig. 1 the circle M represents some transmission medium in which waves flow with the velocity V, entering at the point $a$ and departing at $a'$. P is a pick-up device for collecting energy passing along the medium M and transmitting it to O. The pick-up device P is arranged to rotate about the axis of the medium M so that it passes along the train of waves in the medium. For purposes of illustration, it is assumed that the incoming frequency is to be halved. For this condition it is necessary, as will be seen by reference to equation (1), that the pick-up device rotates in the same direction as the wave motion with a velocity equal to one-half the velocity of the train of waves traveling along the medium.

The curves of Fig. 6 illustrate the operation of frequency reduction for the assumed case. A sending frequency wave is shown, the frequency of which has arbitrarily been chosen, for purposes of illustration, as an integral multiple of the frequency of rotation of the pick-up coil. The train of waves is divided into successive parts, each comprising one and one-half cycles, these parts being successively numbered 1, 2, 3, etc. The medium M is shown in developed form, and a pick-up device schematically indicated below is assumed to pass from the left end of the medium to the right end in a time interval T. After having arrived at the point $a'$ the pick-up device immediately starts at $a$ and repeats its cycle. The wave to be converted is shown passing through the medium, and the converted wave is represented by the curve just below the pick-up device. The four parts of the diagram illustrate, respectively, the position occupied by the pick-up device with respect to the incoming wave at the beginning of operation and after 1, 2 and 3 revolutions have been completed. The medium M is supposed to be of such character that the crest of a wave entering the medium at one end will just pass out at the other end in a time interval $\frac{T}{2}$.

As shown by the upper curve of Fig. 6, the head of the first interval of the wave train and the pick-up device P start from the point $a$ of the medium M together. As the wave train passes along the medium with twice the speed of the pick-up device P, the end of the second interval of the wave train will just be leaving the medium M as the pick-up device P arrives at the point $a'$. The pick-up device will therefore pick up intervals 1 and 2 of the wave train. The two intervals picked up will, however, be transmitted in the time of one rotation, and during this period four parts of the original wave train have passed the point $a$. Therefore the translated wave will have a frequency only half as great as that of the incoming wave. This is illustrated in the second set of curves which show the condition at the end of the time interval T, the pick-up device being shown as again restored to the point $a$ ready for the next revolution.

At the beginning of the second revolution the intervals 3 and 4 of the wave train have already entered the pick-up device so that these two intervals will be lost. The fifth interval is just entering the pick-up device at the beginning of the second revolution, and during this revolution the fifth and sixth intervals will be picked up and reduced in frequency, as indicated by the third set of curves of Fig. 6. Similarly, during the third revolution intervals 7 and 8 will be omitted and intervals 9 and 10 will be reduced in frequency. The wave train finally transmitted by the pick-up device will comprise wave train intervals, 1, 2, 5, 6, 9, 10, etc., with the translated intervals intermediately following each other in point of time.

If the pick-up device P is not set so that it starts a revolution as the crest of the first wave train interval enters the medium M, as shown in Fig. 1, but set 180° out of phase, as shown in Fig. 2, the results will be somewhat similar, but different intervals of the wave train will be suppressed. As shown by the curves of Fig. 7, the pick-up device will be mid-way between points $a$ and $a'$ at the time the first interval of the waves to be translated enters the medium. By the time the pick-up device has arrived at the point $a'$ the first two intervals of the wave train will have entered the medium, the crest of the first interval having arrived at the point $a'$. Therefore, when the pick-up device P passes along the medium from the point $a$, the first two intervals of the wave train will be lost. When the pick-up device again reaches the point midway between $a$ and $a'$, the end of the third interval will also have reached this point, and the third interval will have been picked up and reduced in frequency, as indicated by the second set of curves of Fig. 7. As the pick-up device passes on to the point $a'$, the fourth interval is picked up and transmitted at reduced frequency. Consequently, the wave intervals which are transmitted by the pick-up device will be the third, fourth, seventh, eighth, eleventh, twelfth, etc.

It will be obvious that if either the arrangement shown in Fig. 1 or the arrangement shown in Fig. 2 is provided at the transmitting station, certain of the wave intervals can never be reproduced at the receiving station, for they will not have been transmitted. By employing an arrangement which is a combination of the arrangements of Figs. 1 and 2, however, all of the wave train intervals may be transmitted, although certain intervals will be superposed upon adjacent intervals. Such an arrangement is illustrated in Fig. 3 in which two pick-up devices $P_1$ and $P_2$ are shown 180° apart. The pick-up device $P_1$ may be assumed to pick up and transmit at reduced frequency the wave train intervals, as shown in Fig. 6. The pick-up device $P_2$, on the other hand, may be assumed to pick up and transmit at reduced frequency the wave train intervals shown by the curves of Fig. 7. Consequently, as illustrated by Fig. 8, the transmitted wave trains of Figs. 6 and 7 will be superposed upon each other. In Fig. 8 the wave train corresponding to Fig. 7 is shown in dotted lines. As will be clear from the lower set of curves of Fig. 8, all of the wave train intervals will be present in the translated wave, but after the first interval has been transmitted all of the successive intervals will be superposed upon each other in pairs, that is to say, interval 2 will be superposed on interval 3, interval 5 on interval 4, interval 6 on interval 7, etc.

In order to translate the wave back to its original form or to increase the frequency, it is necessary that the pick-up device travel along the wave to be converted in a direction opposite to that in which the wave is being propagated. The arrangement for increasing the frequency at the receiving station is schematically illustrated in Fig. 4, the device being in all respects similar to the arrangement described in Fig. 1 or Fig. 2, except that the pick-up device moves in a direction opposite to the pick-up device in those machines.

In order to double the frequencies impressed upon the arrangement of Fig. 4, it will be evident from equation (1) that the pick-up device must move with a speed equal to the speed of the wave train, but in the opposite direction. Since the pick-up device of the frequency reducer of Fig. 1, for example, was assumed to make one revolution in the time T, the pick-up device of the frequency increaser of Fig. 1 must make one revolution in time $\frac{T}{2}$, assuming the same wave velocity in the transmitting media of both the increaser and the reducer.

Assume that the converted wave train transmitted by the pick-up device of Fig. 1, or, in other words, the translated wave train illustrated in Fig. 6 is being transmitted to the frequency increaser of Fig. 4. The operation of the frequency increaser will then be as illustrated in Fig. 9. Here the five parts of the diagram represent, respectively, the condition at the beginning of the first revolution of the pick-up device and at the beginning of each of four successive revolutions. As the head of the first interval of the received wave train enters the medium M of Fig. 9 at the point $a$, the pick-up device P starts moving in the opposite direction from the point $a'$. As the wave and the pick-up device move along the medium at the same speed, they will meet midway between the points $a$ and $a'$, and the crest of the wave interval will arrive at the point $a'$, just as the pick-up device arrives at the point $a$. At this time, that is, at the end of the first time interval $\frac{T}{2}$, the end of the first wave interval will just be entering the medium at the point $a$. The pick-up device will therefore have traveled along the entire first interval of a wave train in the time $\frac{T}{4}$, as it encountered the crest of the wave train midway of its revolution. The picked up wave train interval will therefore be transmitted at twice the frequency of the received interval, as indicated by the second set of curves of Fig. 6. This picked up wave will be transmitted during the second time interval $\frac{T}{4}$, the first time interval $\frac{T}{4}$ being blank.

At the beginning of the second revolution the crest of the first wave train interval will have just arrived at the point $a'$ as indicated by the second set of curves of Fig. 9. Consequently, as the pick-up device makes its second revolution, it passes along the first wave train interval again, so that this interval is repeated. The pick-up device arrives midway between points $a$ and $a'$ just as the end of the first wave train interval arrives at this point. During the remainder of its revolution, therefore, it passes along the second wave train interval, and this interval is repeated at double frequency, as indicated by the third set of curves of Fig. 9. During the third revolution the pick-up device again picks up the second interval and also picks up the succeeding wave train interval, which is the fifth interval of the original wave entering the system at the transmitting station. It will thus be seen (see last set of curves of Fig. 9) that the wave finally transmitted by the pick-up device will be a wave of the same frequency as the wave entering the frequency reducer of Fig. 1 (see curves of Fig. 6), but the wave train intervals will be transmitted and repeated in the order 1—1, 2—2, 5—5, 6—6, 9—9, etc.

In the wave finally received the repeated intervals will, to a certain extent, take the place of the intervals which were suppressed at the transmitting end, so that the wave train impressed upon the receiver will approximate that originally generated at the transmitter. Disregarding the first repeated interval, we find the wave train impressed upon the receiver includes intervals 1 and 2 in succession, then intervals 2 and 5 to take the place of intervals 3 and 4 of the original wave train, then intervals 5 and 6 corresponding in time and order to the original intervals of the same number followed by intervals 6 and 9 to take the place of intervals 7 and 8, respectively, of the original wave train, etc.

It will be obvious that if the pick-up device be constructed to make one rotation in the time T, the transmission medium being also doubled in length, the wave train intervals will be repeated in pairs. This follows from the fact that two successive wave train intervals may now exist in the transmission medium at the same time, instead of one. The pick-up device will repeat the pair of intervals during the last half of one rotation and will in turn repeat the same pair of intervals during the first half of the next rotation. Consequently, the wave transmitted will have intervals in the order 1—2, 1—2, 5—6, 5—6, 9—10, etc. It will be seen that in this case the wave train impressed upon the receiver will have its intervals 1—2 and 5—6 with the same frequency and having the same position as in the original wave train with the intervals 1 and 2 repeated to take the place of intervals 3 and 4, respectively, of the original wave train. Similarly, intervals 5 and 6 repeated will take the place of intervals 7 and 8 respectively, of the original wave train, etc.

If the receiving translator be arranged as shown in Fig. 5, the pick-up device will pass each point of the wave train only once. In this case a portion of the medium corresponding to one-half of the revolution of the pick-up device is omitted so that during that half of each revolution the pick-up device receives no energy at all. The converted wave train will consist alternately of portions of the incoming wave separated by a blank interval. This is illustrated by the curves of Fig. 10 in which it is assumed that the wave train transmitted is that shown in Fig. 6 with the result that the wave train impressed upon the receiver will comprise intervals 1—2, 5—6, etc., separated by blank intervals. If the frequency of rotation of the translating device is made sufficiently high, the intervals of the original wave train which are not present and the blank intervals of the wave train impressed upon the receiver will occur with such rapidity that the ear may not detect the mutilation of the signal. However, the effect of the mutilation may be reduced by producing at the receiver waves of the type illustrated in Fig. 9 in which no blank intervals occur and in which the intervals suppressed at the receiving station are replaced by repetitions of transmitted intervals.

The wave finally impressed upon the receiver may be made to contain all of the elements or intervals of the wave originally generated at the transmitter by using an arrangement such as shown in Fig. 3 for reducing the frequency at the transmitting station and an arrangement similar to that of Fig. 4 for increasing the frequency at the receiving station. It will be remembered that, as brought out by the curves of Fig. 8, the wave transmitted from the transmitting station by the pick-up device of Fig. 3 contains all of the elements of the original train of waves, although successive elements are superposed on each other. The curves of Fig. 11 illustrate the operation at the receiving station. The first revolution of the pick-up device transmits no energy during the first interval of time $\frac{T}{4}$. During the second interval of time it transmits the wave element 1 at doubled frequency. During the second interval it repeats the wave element 1 and also transmits the second element of the incoming wave train which comprises superposed components corresponding to original elements 2 and 3. During the third revolution elements 2 and 3 are repeated, and superposed components corresponding to elements 4 and 5 are picked up and reduced in frequency. The wave finally impressed upon the receiver will therefore have the form shown in the lower curve of Fig. 11.

If we examine this wave, taking the component elements indicated by the digits surrounded by circles, we find the components of the original wave in their regular order, namely, components corresponding to 1, 2, 3, 4, 5, 6, etc. Some of these components correspond to elements picked up by the pick-up device $P_1$ at the transmitting station, and others correspond to elements picked up by the pick-up device $P_2$ at the transmitting station, but all of the elements of the original wave train are nevertheless present. In addition to the original wave train there are elements constituting an echo equal in intensity to the original wave component, these echo elements occurring a time interval $\frac{T}{4}$ seconds either before or after the corresponding element of the original wave, for example, element 2 of the original wave if followed by echo element 2 and element 3 is preceded by an echo element 3, etc. The echo effect constitutes a distortion which, however, if the frequency is sufficiently high, may produce no more disconcerting result than is encountered in ordinary practice in connection with echo effects due to reflection on long lines.

The translating device, as schematically indicated in Figs. 1 to 5, inclusive, may be embodied in various forms. The frequency conversion may be accomplished acoustically, for example, by the embodiment illustrated in Figs. 12ª and 12ᵇ. The transmission medium in these figures comprises a circular trough 10 over the top of which is placed a flat disc 11, the disc being capable of rotation with respect to the trough. At the input end the trough may be connected to any source of sound waves, and at the opposite end the sound wave may be led away from the trough by a pipe 13. A telephone transmitter of any well known type may be mounted on the plate 11 at a point over the trough 10, the diaphragm 14 of the transmitter being so imbedded in the plate as to lie flush with the inner surface thereof.

As the disc rotates, the transmitter will travel near the trough and receive the energy which is transmitted into the trough from the input 12. The electrical circuit is shown completed through the slip rings attached to the rotating disc. If the translating device is to function in the manner shown schematically in Fig. 3, an additional transmitter with its diaphragm 15 may be imbedded in the plate at a point 180° out of phase with the transmitter 14. The circuits of the transmitter will be connected to the slip rings as shown so that the waves picked up by each transmitter will be superposed in the manner already described. An amplifier A and selective circuit F of any well known type may be connected, if desired, in the output circuit associated with the slip rings. Where the arrangement is to be used at the receiving end in accordance with the principle schematically outlined in Fig. 5, the trough 10 will comprise only one-half of a complete circle.

The frequency conversion may also be accomplished electromagnetically by means of the apparatus indicated in Figs. 13ª to 13ᵈ, inclusive. The essential elements of the arrangement are shown conventionally in Fig. 13ª and comprise an artificial line 16 constituting the transmitting medium, the artificial line being connected at one end to an input circuit 17 and terminated at the opposite end in a network 18 to prevent reflection. The artificial line is arranged in the form of a circle, and the pick-up device constitutes a coil 19 connected to suitable slip rings and arranged to rotate about the axis of the artificial line.

The artificial line may be constructed as a part of the stator element 20 of a generating machine, the inductance coils of the successive sections of the artificial line being mounted on the pole teeth 21 of the stator. The stator is shown in developed form in Fig. 13ᶜ. The windings are looped around the poles in such a way that they would all have the same polarity if a direct current were passed through the windings.

The condensers, to form the shunt elements of the artificial line, are bridged across the two halves of the circuit, as shown in Fig. 13ᶜ. These condensers are so proportioned with respect to the coils that the artificial line will have a substantially constant velocity of propagation over the band of signal frequencies to be transmitted. The artificial line should also have negligible attenuation for these frequencies. The incoming oscillations enter the artificial line at some point on the stator 20 and travel around the stator through the artificial line and out into the terminating network 18. A wave of magnetic flux corresponding to the wave in the artificial line is therefore made to travel around the stator. By the construction of the artificial line according to the principles of the well known low pass filter, the rotating field about the stator will exhibit the desired property of having speed of rotation which is independent of the frequency, instead of being proportional to the frequency, as in the case of the ordinary rotating field. If an ordinary rotating field were used, the operation of the stator would lead to a simple process of modulation or shifting of all the frequencies by a fixed amount without reducing the band width.

The pick-up coil 19, shown schematically in Fig. 13ᵈ, may, if desired, comprise a plurality of turns of wire mounted on the teeth of a suitable rotor element 22, as indicated in Fig. 13ᵇ. If the coils are wound upon only one tooth of the rotor, the converter will operate similar to the arrangements schematically indicated in Fig. 1. If a second coil is placed on a tooth diagonally opposite to the first, the converter may be made to operate on the principle of the machine of Fig. 2. The pick-up coil or coils are connected through slip rings, as already stated, to the output circuit, and preferably, the impedance looking into the output circuit should be so high as to produce substantially the effect of an open circuit in order to avoid any reaction upon the stator which would result in the generation of extraneous frequencies. This may readily be accomplished by including an amplifier A in the output circuit, the amplifier comprising a vacuum tube having its grid circuit so poled as to be normally negative with respect to the filament. Potential variations impressed upon the grid circuit will therefore produce no flow of current in the grid circuit but will merely change the potential of the grid. If desired, a suitable selective circuit F of any well known type may be inserted in the output circuit of the amplifier.

In case the artificial line type of device just described is to be used for increasing the frequency at the receiving end of the system, the frequency band entering the artificial line of the frequency increaser will only be half as wide as that entering the frequency reducer at the sending end. Consequently the cut-off point of the artificial line at the receiving station may be made only half as high as that of the artificial line of the frequency reducer. Its velocity will accordingly be half the velocity of the artificial line of the frequency reducer at the transmitting station. Therefore the rotor velocities may be made equal to both the frequency reducer and the frequency increaser, but the rotation will be in opposite directions.

As above pointed out, the distortion decreases as the time interval T becomes shorter. In order to make this interval as short as possible without rotating the pick-up device at an impracticable rate of speed, the artificial line on the stator may be segmented as illustrated in Fig. 14. If, for example, the artificial line is divided into six equal parts, as shown, T would be only one-sixth as long as if the line were continued completely around the stator. The input circuit is connected in parallel to each of the input terminals of the artificial line segment, and each segment is terminated in a network to reduce reflection. The rotation of a pick-up coil along a given artificial line segment completes one cycle of operation, the rotation of the same pick-up device along the next artificial line segment completes a second cycle of operation, etc. Preferably, a pick-up coil will be provided for each artificial line segment, all of the coils being connected to common slip rings. Consequently, all of the coils will be simultaneously picking up and changing in frequency the same wave train interval at the same time interval or intervals.

Fig. 15 illustrates how the arrangement of Fig. 14 may be modified where it is desired to use two rotating coils in accordance with the principle schematically indicated in Fig. 3. Here the coils are arranged in pairs so spaced with respect to each other that one coil will be just leaving the artificial line segment when the other coil of the pair is half way along the segment. One coil of each pair is connected in parallel with all of the similar coils to one pair of slip rings connected through a suitable amplifier and delay circuit X to the input side of a suitable selective circuit F. The other coils of each pair are connected in parallel to another pair of slip rings and thence through a suitable amplifier A', delay circuit X', to the input terminals of the selective circuit F. The wave element simultaneously picked up by one set of coils will therefore be superposed on the waves simultaneously picked up by the other set of coils. The delay circuits X and X' may be adjusted so that the time relation of the wave train delivered by each set of coils will give minimum distortion. As is well understood, the delay circuits may be adjustable artificial lines or other networks of a type well known in the art.

It will be obvious that the general principles herein disclosed may be embodied in many other organizations widely different from those illustrated without departing from the spirit of the invention as defined in the following claims.

What is claimed is:

1. The method of reducing the width of a band of signaling frequencies during transmission which comprises reducing the frequency of successive time elements of a train of waves element by element, transmitting separated portions of the converted wave train in such time relation to each other that no blank intervals will exist, translating the converted wave train portion by portion to a higher frequency and repeating translated wave portions so that the repeated portions will occupy the gaps between the translated wave portions.

2. The method of reducing the width of a band of signaling frequencies during transmission which comprises reducing the frequency of successive intervals of a wave train portion by portion to produce corresponding wave portions occupying greater time intervals, superposing successive converted portions so that a plurality of successive converted portions will be transmitted in the same time interval, translating the resultant converted wave train portion by portion into waves of higher frequency, and repeating translated wave portions at successive intervals to fill up the intervals which would otherwise be blank due to the shorter time interval required for each translated portion.

3. The method of reducing the width of a band of signaling frequencies comprising transmitting a wave train corresponding to the band along a transmission medium, moving a pick-up device successively along the medium at a rate slower than the rate of propagation of said wave, thereby reproducing separated portions of the wave train at lower frequencies without reproducing intermediate portions, transmitting the converted wave train thus produced, propagating the converted wave train along a second transmission medium, successively moving a pick-up device along said medium in a direction opposite to the direction of propagation of the converted wave train, thereby translating successive portions of the received wave train into waves of higher frequency but occupying shorter time intervals, and repeating converted wave portions at successive intervals so that the wave finally transmitted will be continuous.

4. The method of reducing the width of a band of signaling frequencies which comprises propagating a wave train corresponding to the band along a transmission medium, successively moving a plurality of pick-up devices along said medium so that one pick-up device will reproduce separated portions of the wave train with reduced frequency but occupying a greater time interval, and another pick-up device will similarly reproduce wave portions not reproduced by said first pick-up device, superposing the waves thus converted to produce a transmitted wave containing all portion of the original wave superposed upon each other and reduced in frequency, propagating the transmitted wave train along a second medium, moving a pick-up device along said medium in a direction opposite to the direction of propagation of said wave train thereby reproducing successive time intervals of the received wave train in shorter time intervals, and repeating each converted time interval of a wave to fill up the gaps between the reproduced intervals.

5. In a system for reducing the width of a band of signaling frequencies, a frequency reducing apparatus at one station comprising a transmitting medium along which a wave train corresponding to the band is propagated, means for successively passing a pick-up device along said medium in the same direction as the direction of propagation of the waves and at a lower speed, thereby reproducing separated portions of the original wave train at reduced frequencies with each converted portion occupying a longer time interval than the original portion, and a frequency increasing apparatus for reexpanding the converted wave thus produced, said apparatus comprising a transmission medium along which the converted wave train is propagated, means for successively moving a pick-up device along said medium in a direction opposite to the direction of propagation of the wave train, thereby reproducing the transmitted portion of the converted wave train so that each portion has a higher frequency but occupies a shorter time interval, each successive movement of the pick-up device also repeating a wave portion previously increased in frequency so that the repeated wave portions will occupy the blank time intervals following the wave portion previously converted.

6. In a system for reducing the width of a band of signaling frequencies, a frequency producing apparatus comprising a transmission medium arranged in the form of an open circle so that the wave train corresponding to the band may enter the medium at one side of the gap and be transmitted along the medium to leave the same at the other side of the gap, a pick-up device rotating along the medium in the same direction as the direction of wave propagation but at a slower speed than the wave, thereby reproducing separated portions of a wave train at lower frequencies with each portion occupying a greater time interval than the original portion, and a frequency increasing arrangement for again expanding the width of the band thus transmitted, said arrangement comprising a second transmission medium arranged in the form of an open circle so that the wave train may enter the medium at one side of the gap and be transmitted along the medium to leave at the other side of the gap, and a pick-up device rotatable about the axis of the transmission medium in a direction opposite to the direction of propagation of the wave train, thereby reproducing successive portions of the converted wave train with increased frequency, but each portion occupying a time interval shorter than the corresponding received portion, the successive revolutions of said pick-up device repeating portions previously converted to occupy otherwise blank time intervals following the reproduced portions.

7. In a system for reducing the width of a band of signaling frequencies, a frequency reducing arrangement comprising a transmission medium along which a wave train corresponding to the band may be propagated, means to successively pass a pick-up device along the said medium in the direction of propagation of said wave train but at a slower speed, thereby reproducing separated portions of the wave train at lower frequencies, means to successively move a second pick-up device along the medium in a similar manner to pick up and similarly convert other separated portions of the wave train, means to combine the converted wave portions from the pick-up devices so that converted wave portions corresponding to successive wave portions of the original train will be superposed, and a frequency increasing arrangement at a receiving station comprising a transmission medium along which the converted wave train may be propagated, means to successively move a pick-up device along said transmission medium in a direction opposite to the direction of propagation of the converted wave train, thereby reproducing successive portions of the received wave train at a higher frequency but each portion occupying a shorter time interval, the successive movement of said pick-up device repeating a portion previously converted to occupy the otherwise blank time interval following the previously converted portion.

8. In a system for reducing the width of a band of signaling frequencies, a frequency reducing arrangement comprising a transmission medium arranged in the form of an open circle so that the wave train corresponding to the band may enter the medium at one side of the gap and be propagated along the medium to leave at the other side of the gap, means to rotate a pick-up device about the axis of said medium in the same direction as the direction of propagation along the medium but at a slower speed, thereby reproducing separated portions of the wave train at lower frequencies, means to rotate a second pick-up device along said medium in a similar manner to pick up and reproduce other separated portions of the wave train, means to superpose the converted waves from the two pick-up devices so that portions corresponding to successive portions of the original wave will occupy the same time interval, and a frequency reducing apparatus at the receiving station comprising a transmission medium arranged in the form of an open circle so that the converted wave train may enter at one side of the gap and be propagated along the medium to leave at the other side of the gap, means to rotate a pick-up device about the axis of said medium and in a direction opposite to the direction of wave propagation, thereby reproducing portions of the received wave at a higher frequency but each portion occupying a shorter time interval than the received converted portion, successive revolutions of said pick-up device repeating wave portions previously reproduced to occupy the otherwise blank interval following the portion previously reproduced.

9. The method of reducing the width of the band of signaling frequencies during the transmission which comprises reducing the frequency of separated portions of a continuous train of waves portion by portion, transmitting the portions of the wave train thus converted, and translating the converted wave train portion by portion to a higher frequency.

10. The method of reducing the width of a band of signaling frequencies comprising transmitting a wave train corresponding to the band along a transmission medium, moving a pick-up device successively along the medium at a rate slower than the rate of propagation of said wave, thereby reproducing separated portions of the wave train at lower frequencies without reproducing intermediate portions, transmitting the converted wave train thus produced, propagating the converted wave train along a second transmission medium, and successively moving a pick-up device along said medium in a direction opposite to the direction of propagation of the converted wave train, thereby translating successive portions of the received wave train into waves of higher frequency but occupying shorter time intervals.

11. In a system for reducing the width of a band of signaling frequencies, a frequency reducing apparatus at one station comprising a transmitting medium along which a wave train corresponding to the band is propagated, means for successively passing a pick-up device along said medium in the same direction as the direction of propagation of the waves and at a lower speed, thereby reproducing separated portions of the original wave train at reduced frequencies with each converted portion occupying a longer time interval than the original portion, and a frequency increasing apparatus for re-expanding the converted wave thus produced, said apparatus comprising a transmission medium along which the converted wave train is propagated, and means for successively moving a pickup device along said medium in a direction opposite to the direction of propagation of the wave train, thereby reproducing the transmitted portion of the converted wave train so that each portion has a higher frequency but occupies a shorter time interval.

12. In a system for reducing the width of a band of signaling frequencies, a frequency producing apparatus comprising a transmission medium arranged in the form of an open circle so that the wave train corresponding to the band may enter the medium at one side of the gap and be transmitted along the medium to leave the same at the other side of the gap, a pick-up device rotating along the medium in the same direction as the direction of wave propagation but at a slower speed than the wave, thereby reproducing separated portions of a wave train at lower frequencies with each portion occupying a greater time interval than the original portion, and a frequency increasing arrangement for again expanding the width of the band thus transmitted, said arrangement comprising a second transmission medium arranged in the form of an open circle so that the wave train may enter the medium at one side of the gap and be transmitted along the medium to leave at the other side of the gap, and a pick-up device rotatable about the axis of the transmission medium in a direction opposite to the direction of propagation of the wave train, thereby reproducing successive portions of the converted wave train with increased frequency, but each portion occupying a time interval shorter than the corresponding received portions.

In testimony whereof, we have signed our names to this specification this ninth day of December 1924.

NORMAN R. FRENCH.
MANVEL K. ZINN.